(12) United States Patent
Lan et al.

(10) Patent No.: US 7,232,171 B2
(45) Date of Patent: Jun. 19, 2007

(54) ALL-TERRAIN VEHICLE GLOVE COMPARTMENT

(75) Inventors: Tzu-Jung Lan, Kaohsiung (TW); Wen-Ming Su, Kaohsiung (TW); Wei-Hsiung Wang, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 291 days.

(21) Appl. No.: 10/935,151

(22) Filed: Sep. 8, 2004

(65) Prior Publication Data

US 2006/0049619 A1 Mar. 9, 2006

(30) Foreign Application Priority Data

Jul. 30, 2004 (CN) ................................. 93 1 23041

(51) Int. Cl.
*B60R 7/02* (2006.01)
(52) U.S. Cl. .................. 296/37.1; 180/68.5; 297/188.1
(58) Field of Classification Search ............... 296/37.1, 296/37.12; 280/1–192; 224/101–572; 180/68.5; 297/188.01, 188.08, 188.09, 188.1
See application file for complete search history.

(56) References Cited

U.S. PATENT DOCUMENTS

| | | | | |
|---|---|---|---|---|
| 4,325,562 A | * | 4/1982 | Yamada et al. | 280/62 |
| 4,802,682 A | * | 2/1989 | Yasuji | 180/219 |
| 4,826,057 A | * | 5/1989 | Yamada | 224/412 |
| 4,901,813 A | * | 2/1990 | Kimura et al. | 180/230 |
| 4,915,188 A | * | 4/1990 | Ota et al. | 180/219 |
| 5,040,632 A | * | 8/1991 | Fujii et al. | 180/219 |
| 5,060,748 A | * | 10/1991 | Iwai et al. | 180/215 |
| 6,357,542 B1 | * | 3/2002 | Sako | 180/68.5 |
| 6,582,001 B2 | * | 6/2003 | Yagisawa et al. | 296/37.1 |
| 6,837,330 B2 | * | 1/2005 | Suzuki | 180/348 |
| 6,973,987 B2 | * | 12/2005 | Damon | 180/68.5 |

* cited by examiner

*Primary Examiner*—Dennis H. Pedder
*Assistant Examiner*—Michael Hernandez
(74) *Attorney, Agent, or Firm*—Leong C. Lei (57) ABSTRACT

An all terrain vehicle glove compartment provided below the seat of the vehicle to increase usable space includes an extension deck extending from the base of the compartment towards the rear or along the direction of the width of body of the vehicle to define a chamber for accommodating a battery; two positioning ribs extending from the bottom of the extension deck to secure the battery in position; and a lid fastened to the extension deck to fend off water and dust, and to serve as an access for replacing or providing service to the battery.

1 Claim, 9 Drawing Sheets

ALL-TERRAIN VEHICLE GLOVE COMPARTMENT

BACKGROUND OF THE INVENTION (a) Technical Field of the Invention

The present invention is related to an all terrain vehicle glove compartment, and more particularly, to a glove compartment integrated with an extended chamber to increase the usable space in the glove compartment.

(b) Description of the Prior Art

Figure 1:
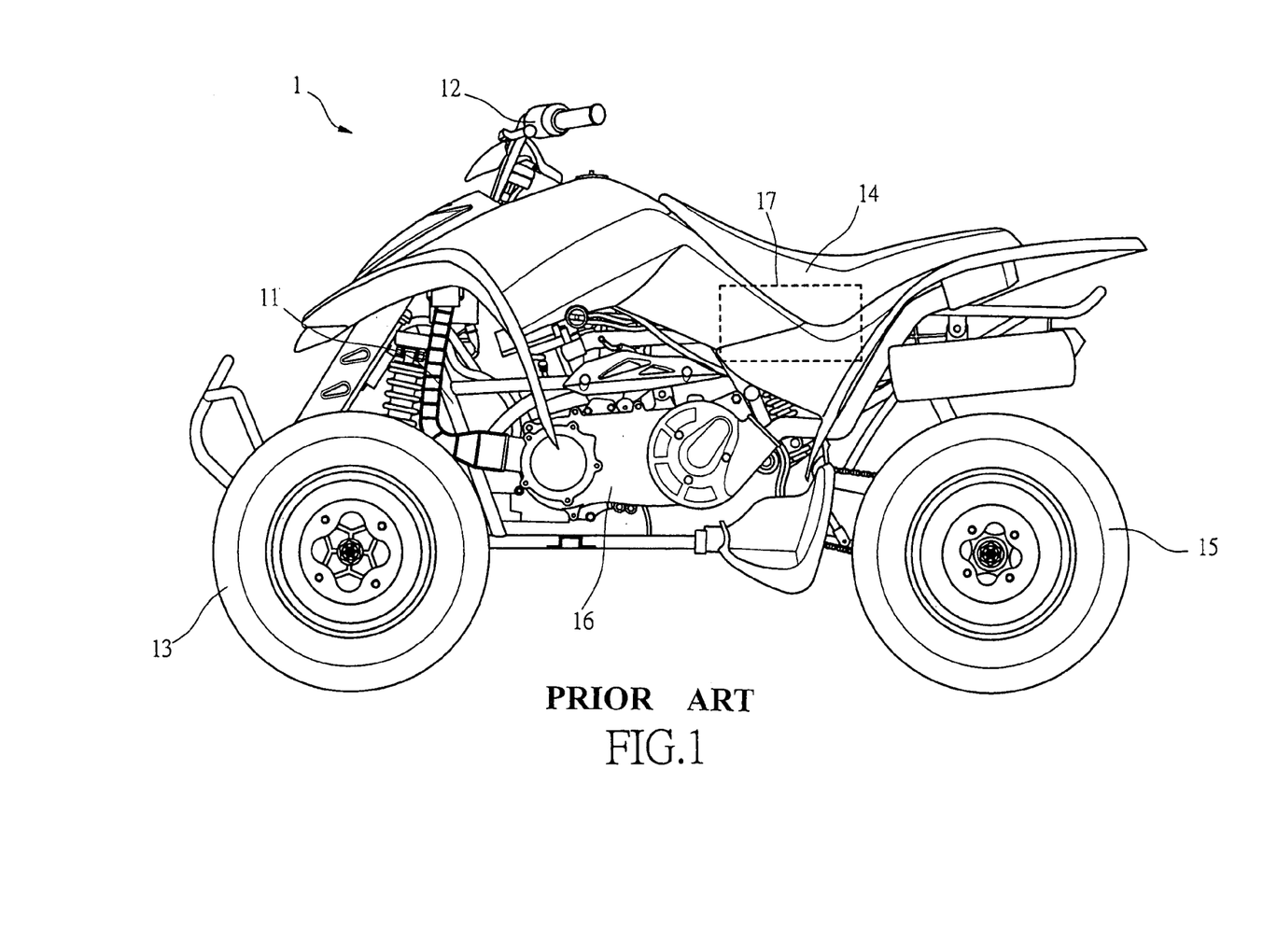
FIG. 1 is a side view of an all terrain vehicle of the prior art.

As illustrated in FIG. 1 of the accompanying drawing for a glove compartment provided to an all terrain vehicle 1, the vehicle 1 is essentially comprised of a frame 11, a steering mechanism 12, a front wheel 13, a seat 14, a rear wheel 15 and a motive power unit 16. The front of the frame 11 is pivoted with the steering mechanism 12; the front wheel is provided below the steering mechanism 12; the seat 14 is provided on top of the frame 11 for rider, and the motive power unit 16 is provided below the seat 14. Fresh air in the ambient is introduced to mix with the friel and the air-fuel mixture is injected into a cylinder inside the motive power unit 16 to be ignited and exploded to produce motive power to drive the rear wheel 15, thus driving the front wheel to move forward.

The operation of the all terrain vehicle 1 depends on multiple dynamo-electric and electronic parts and accessories. To maintain the normal function of those parts and accessories, a battery B is provided to supply consistent power to them. By placing the battery B in a glove compartment 17 allows the battery B to be protected by the glove compartment 17 to prevent contamination by water, dust or other foreign matters. Therefore, the glove compartment 17 is provided below the seat 14 to put in some personal belongings.

Figure 2:
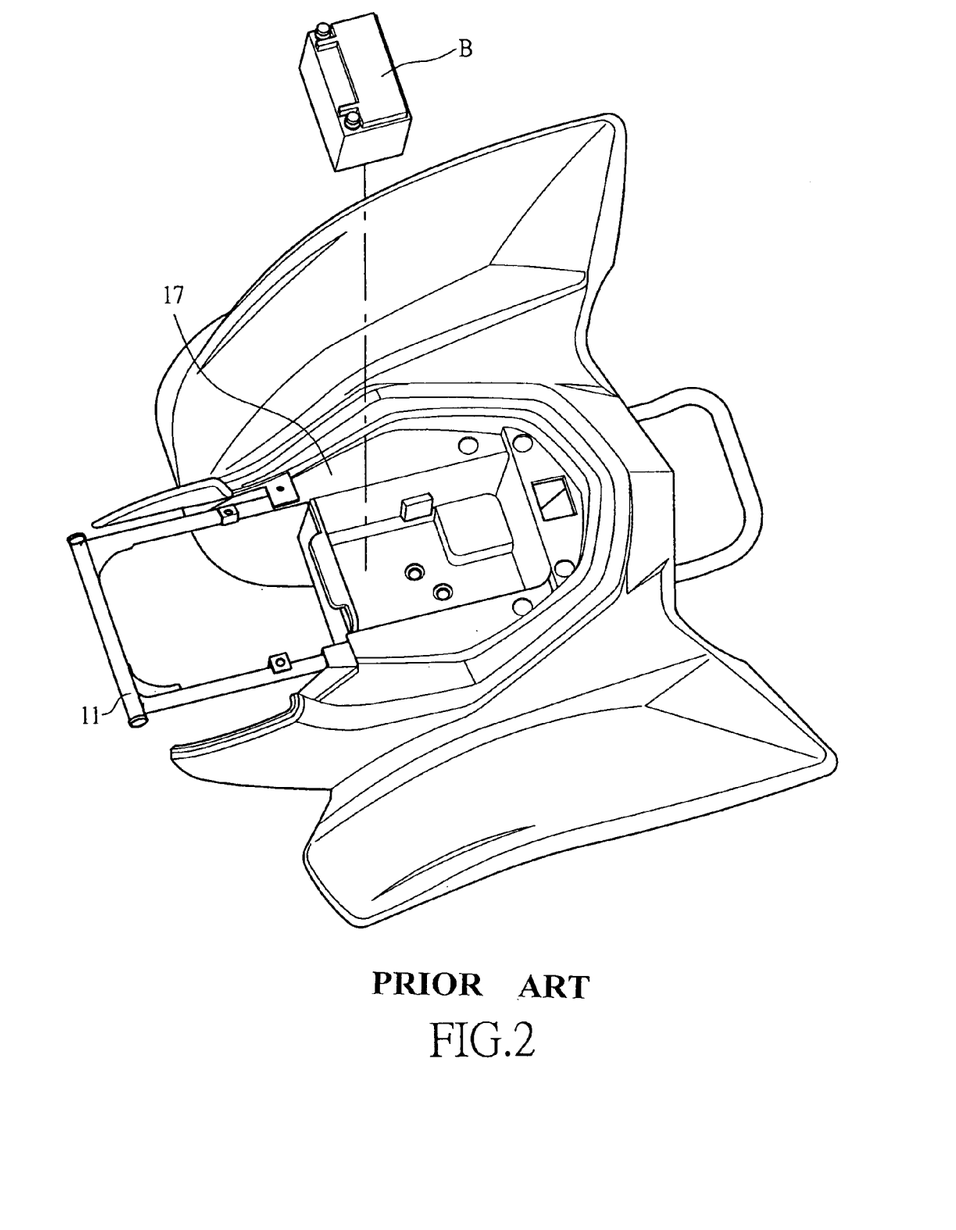
FIG. 2 is a bird's view of a glove compartment of the prior art.
Figure 3:
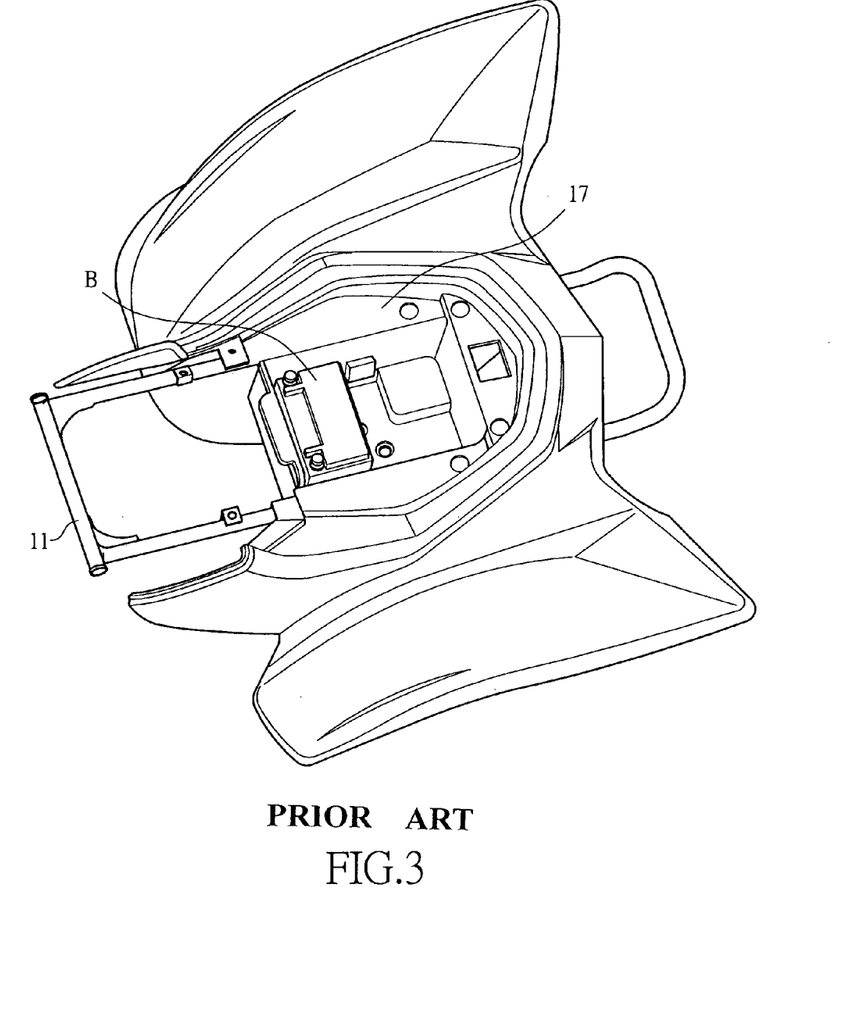
FIG. 3 is a bird's view of a battery placed in the glove compartment of the prior art.

Referring to FIG. 2, the glove compartment 17 is fixed to the frame 11 and below the seat 4; therefore, any attempted extension of the glove compartment 17 is feasible to the space below the glove compartment 17. However the motive power unit 16 is located below the glove compartment 17. Accordingly, the space available for the glove compartment 17 is very limited for being restricted by the layout of the seat 14 and the motive power unit 16 as illustrated in FIG. 3, and there is not much room left for other objects after the installation of the battery B in the glove compartment 17.

SUMMARY OF THE INVENTION

The primary purpose of the present invention is to provide a construction of a glove compartment for an all terrain vehicle essentially by extending an extension deck from the base of the glove compartment disposed below a seat toward the rear or in the body width direction of the vehicle to define a chamber for accommodating a battery thus to enlarge the usable space of the glove compartment.

Another purpose of the present invention is to provide a construction of a glove compartment for an all terrain vehicle by extending from the base of the glove compartment disposed below the seat towards the rear of the vehicle, and two positioning ribs in relation to each other extend upward from the bottom of the extension deck to secure the battery in place.

Yet another purpose of the present invention is to provide a construction of a glove compartment for an all terrain vehicle essentially by extending an extension deck from the base of the glove compartment disposed below a seat toward the rear or in the body width direction of the vehicle to define a chamber, and the extension deck is provided with a lid to fend of dust and water, and serve as the access for replacing or providing service to the battery.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 4:
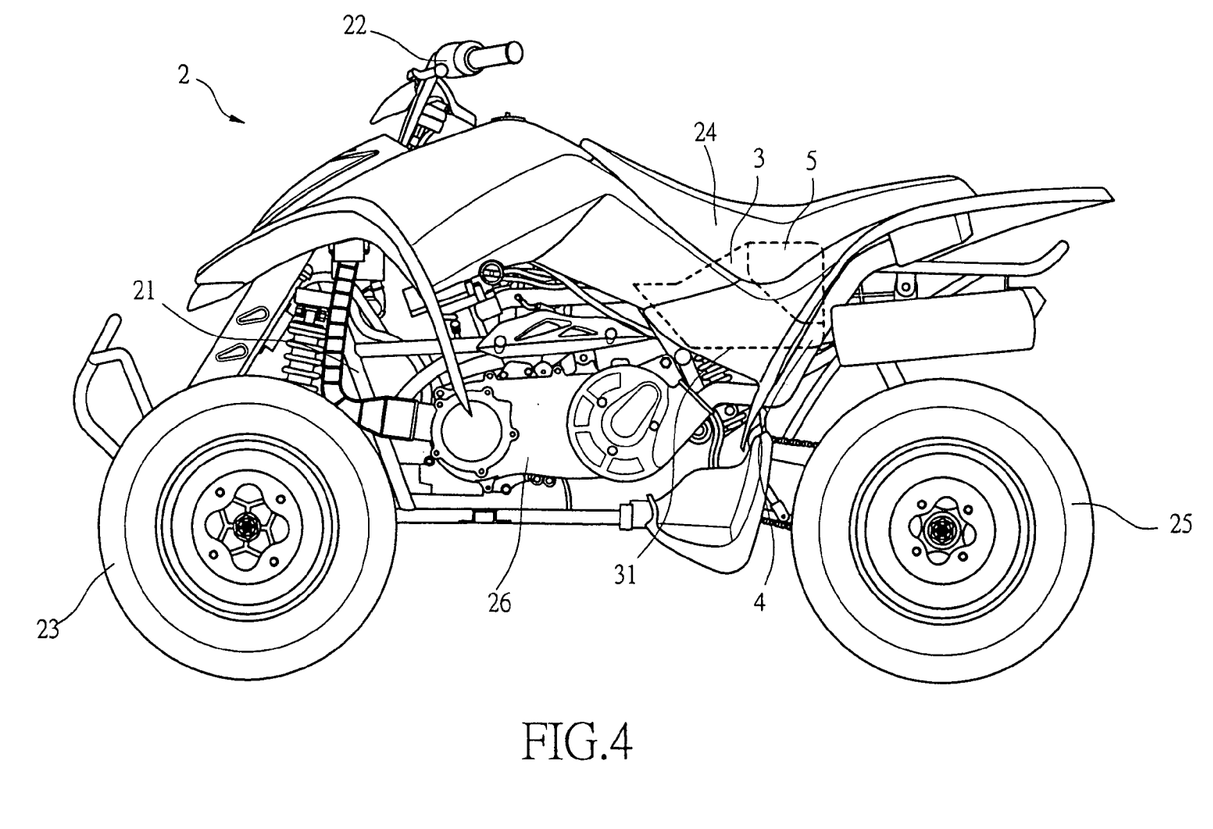
FIG. 4 is a side view of an all terrain vehicle of the present invention.

Referring to FIG. 4, an all terrain vehicle 2 of the present invention is essential comprised of a frame 21, a steering mechanism 22, a pair of front wheels 23, a seat 24, a pair of rear wheels 25, a motive power unit 26, and a glove compartment 3 disposed below the seat 24.

The steering mechanism 22 is pivoted to the front portion of the frame 21. The front wheels 23 are arranged under the steering mechanism 22. The seat 24 is provided on the top of the frame 21. The glove compartment 3 is disposed between the seat 24 and the motive power unit 26. The rear wheels 25 are connected to the rear of the frame 21. It is to be noted that whereas the connection between the members and the assemblies as well as the operation of the all terrain vehicle 2 are the same as that of the prior art, the connection will not be repeated and the disclosure of the present invention below is limited to where the improvement is made.

Figure 5:
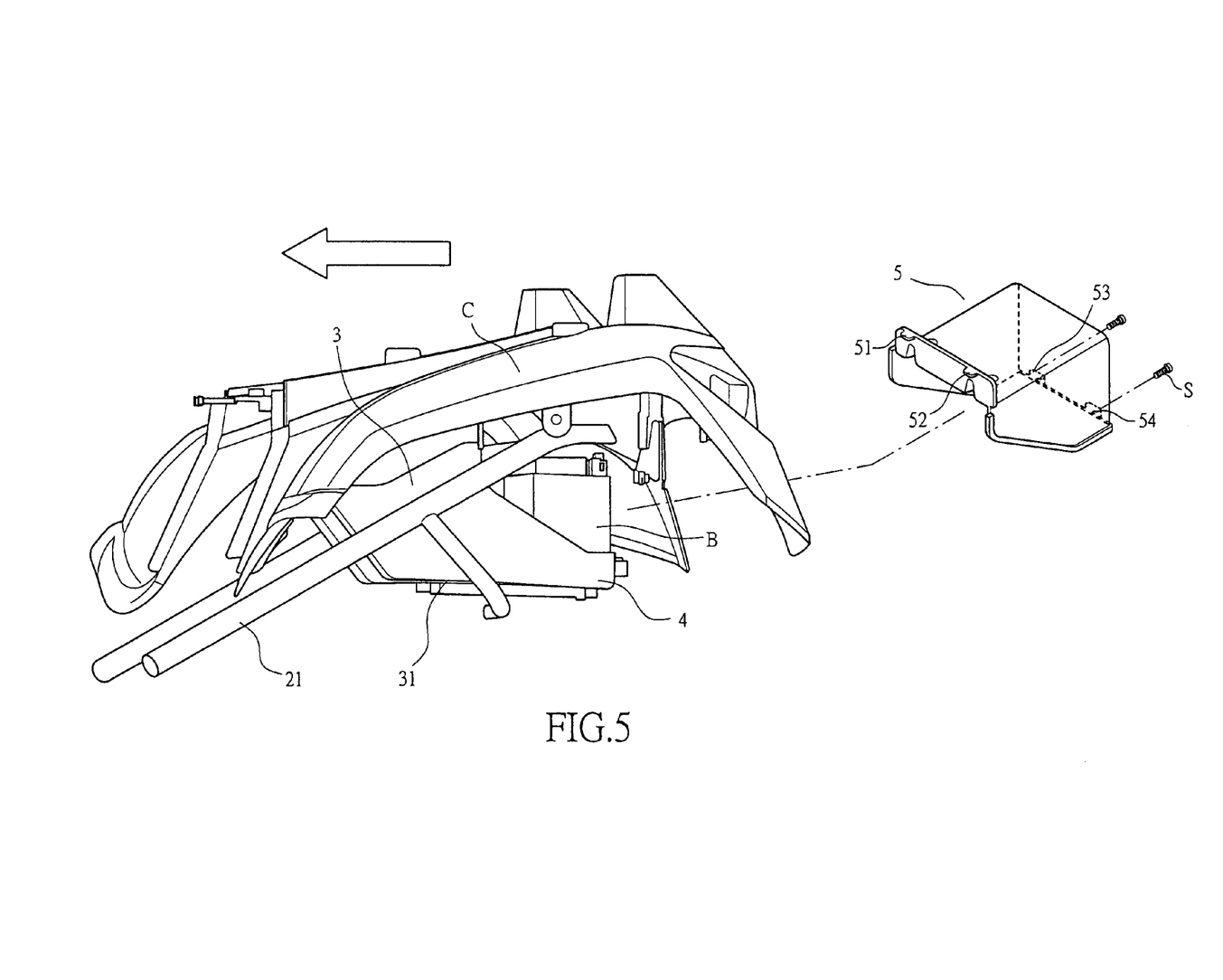
FIG. 5 shows an exploded view showing the side of a glove compartment of the present invention.

Referring to FIGS. 5 and 5A, the seat 24 is fixed above the body cover. C and the glove compartment 3 is disposed below the seat 24. The base 31 of the glove compartment extends toward the rear of the body (in the opposite direction as indicated by the arrow) to form an extension deck 4 so as to define a chamber for accommodating the battery B. The extension deck 4 is further provided with a lid 5 secured to the extension deck 4 by means of fastening elements S.

Figure 6:
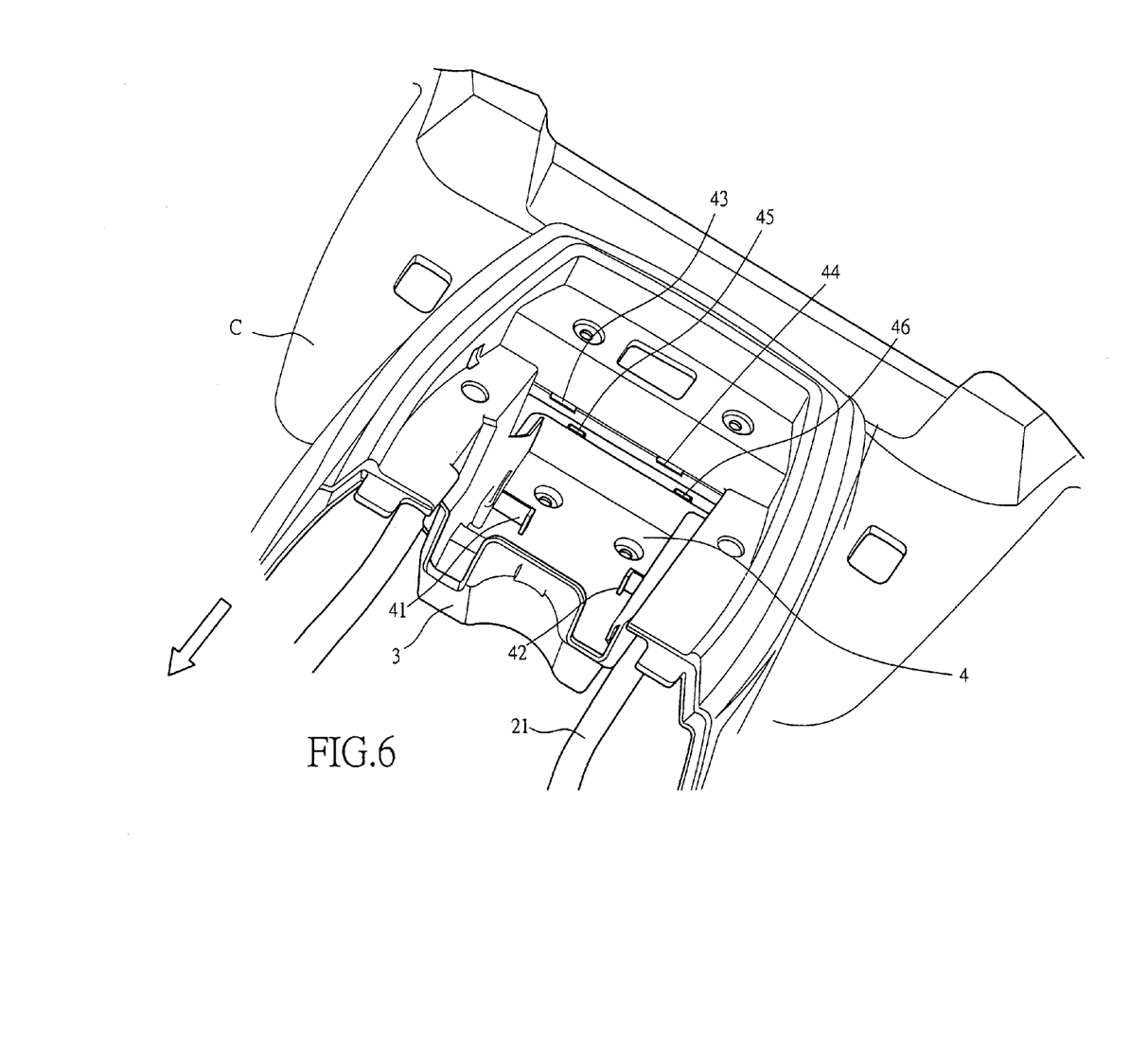
FIG. 6 is a bird's view of the glove compartment of the present invention.

The extension deck 4 extending from the base 31 of the glove compartment 3 has an open end, and a pair of positioning ribs 41, 42 in relation to each other extend upwardly from the bottom of the extension deck 4 as illustrated in FIG. 6 to merely secure the battery B therein. Two insertion holes 43, 44 are formed on the upper end of the extension deck 4 to receive insertion by two protrusion bits 51, 52 of the lid 5. Two locking holes 45, 46 are provided at the end of the extension deck 4.

Figure 7:
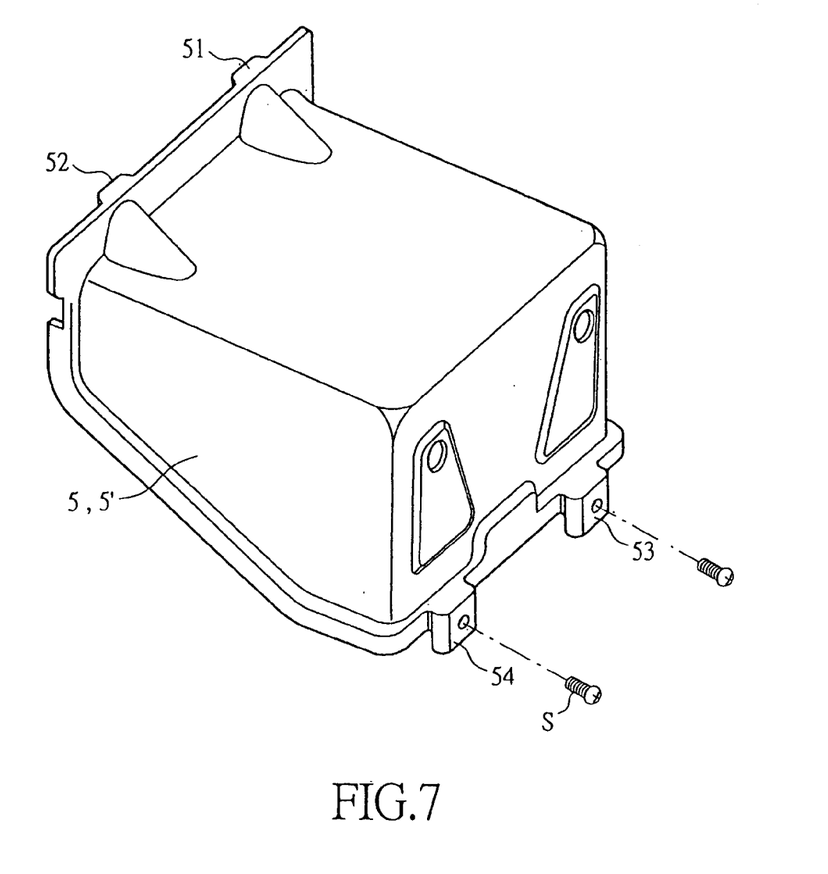
FIG. 7 is a perspective view of a lid of the present invention.

As illustrated in FIG. 7, the shape of the lid 5 is made corresponding to the open end of the extension deck 4 and those two protrusion bits 51, 52 being provided on the top end of the open side of the lid 5 merely insert into respective insertion holes 43, 44 of the extension deck 4. Two fixation holes 53, 54 are provided on the lower end of the lid 5 aligned with the locking holes 45, 46 of the extension deck 4.

Figure 8:
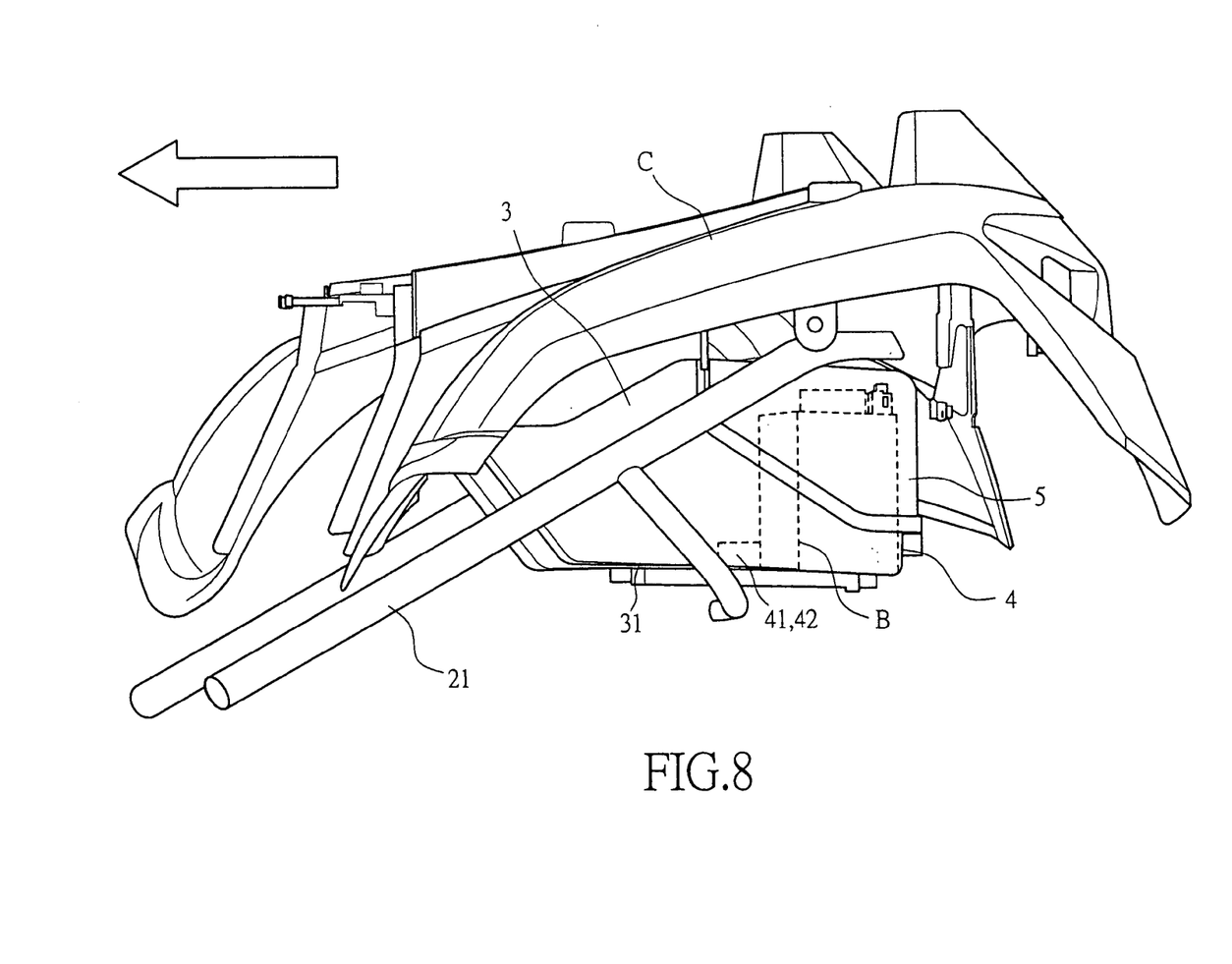
FIG. 8 is a schematic view showing a preferred embodiment of the present invention.

Upon incorporating the lid 5 to the extension deck 4, both protrusion bits 51, 52 of the lid 5 are inserted into their respective insertion holes 43, 44 of the extension deck 4. The fastening elements S are inserted through the fixation holes 53, 54 of the lid 5 to lock into the locking holes 45, 46 to complete the assembly of the extension deck 4 and the lid 5 to take advantage of the chamber to accommodate the battery B as illustrated in FIG. 8 to protect the battery B from being contaminated by water, dust or other foreign matters. Upon replacing or providing service job on the battery B in the chamber, both fastening elements S are removed to separate the lid 5 from the extension deck 4 to remove the battery B.

Figure 9:
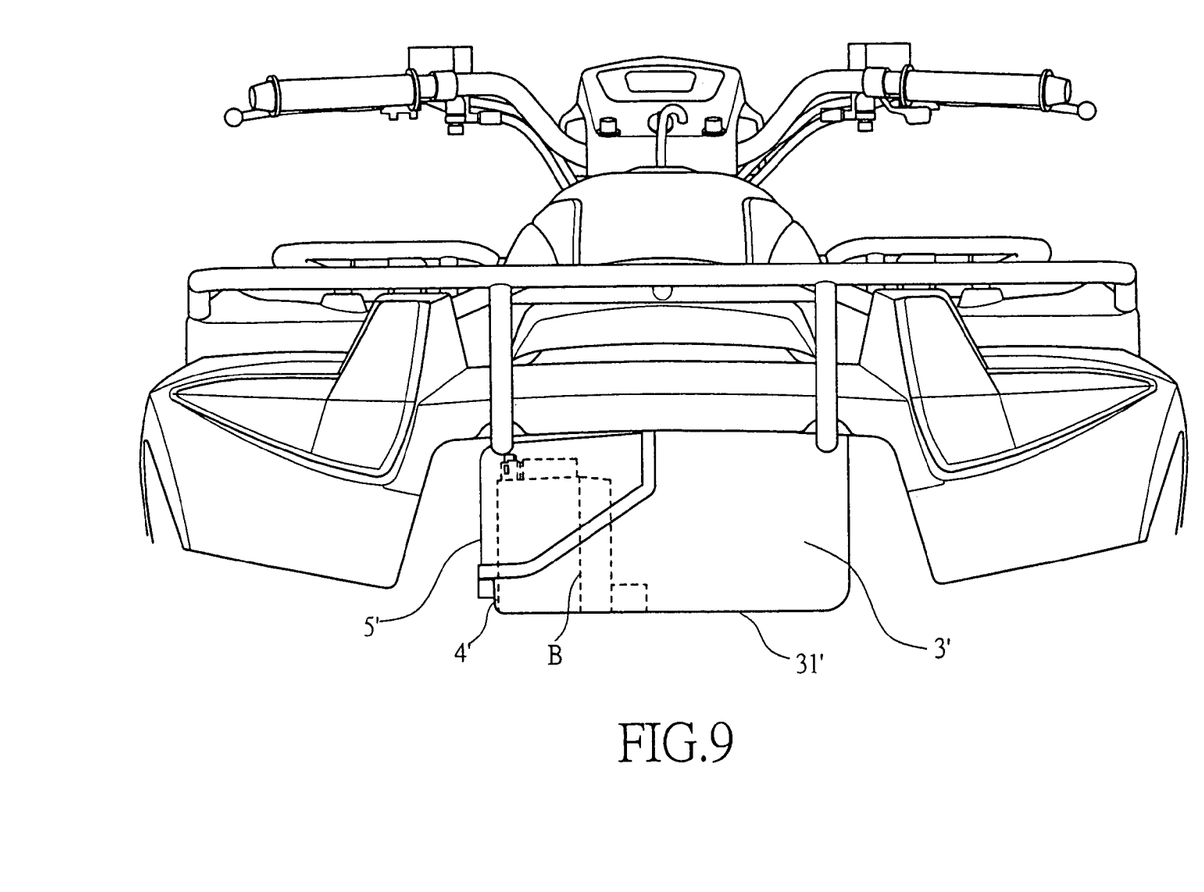
FIG. 9 is a schematic view showing another preferred embodiment of the present invention.

In another preferred embodiment of the present invention as illustrated in FIGS. 7 and 9, it differs from the first preferred embodiment in the direction of the extension deck 4 is provided. A chamber is defined by an extension deck 4' extended from a base 31' of a glove compartment 3' in the direction of the width of the body. With the batter B placed in the extension deck 4', a lid 5' is incorporated to the extension deck 4'. Again, in replacing or providing service job to the battery B in the chamber, both fastening elements S (not illustrated) are removed to separate the lid 5' from the extension deck 4' to remove the battery B.

The present invention by extending from the base 31, 31' of the glove compartment 3, 3' the extension deck 4, 4' to define a chamber for accommodating the battery B thus to enlarge in turn the usable space of the glove compartment 3, 3'. With the lid 5, 5' provided to the extension deck 4, 4', it takes only to separate the lid 5, 5' from the extension deck 4, 4' to remove the battery B for replacement or service purpose. The lid 5, 5' allows easy access to the battery B and protects it from being contaminated by water, dust or other foreign matters. Furthermore, both positioning ribs disposed on the extension deck 4 helps secure the battery B in position.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. In an all terrain vehicle comprising a frame, a steering mechanism, a pair of front wheels, a seat, a pair of rear wheels, a motive power unit, a battery and a glove compartment, said steering mechanism being pivoted to a front portion of said frame, said front wheels being arranged under said steering mechanism, said seat being provided on a top of said frame, said rear wheels being connected to a rear of said frame, the improvement wherein said glove compartment is disposed between said seat and said motive power unit, said glove compartment having a base which extends toward a rear of said vehicle to form an extension deck thereby defining a chamber for accommodating said battery, said extension deck being further provided with a lid secured to said extension deck, said extension deck having an open end and a pair of positioning ribs extending upwardly from a bottom of said extension deck to secure said battery therein, two insertion holes being formed on an upper side of said open end of said extension deck, two locking holes being formed on a lower end of said open end of said extension deck, said lid being provided with two protrusion bits adapted to be inserted into said insertion holes of said extension deck and two fixation holes aligned with said locking holes of said extension deck, and two fastening elements extending through said fixation holes of said lid and said locking holes of said extension deck.

* * * * *